Oct. 3, 1961     F. L. DOBLHOFF     3,002,569
LOCKING DEVICE FOR FLOATING HUB HELICOPTER ROTORS
Filed May 28, 1959     3 Sheets-Sheet 1
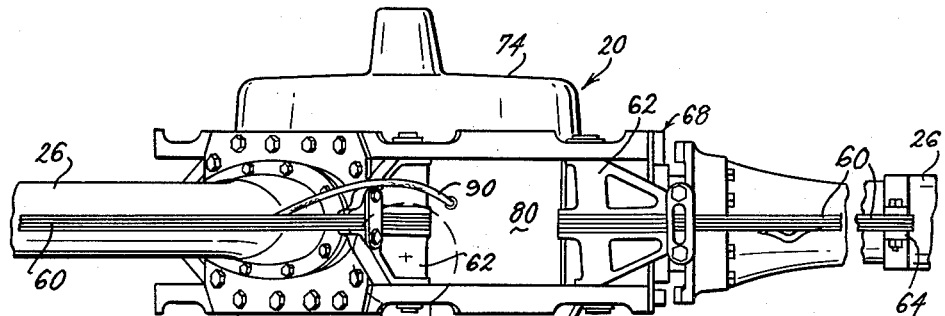
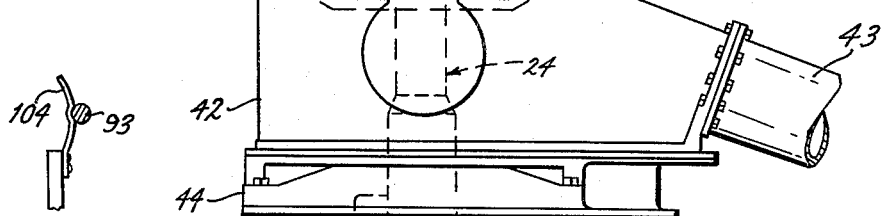
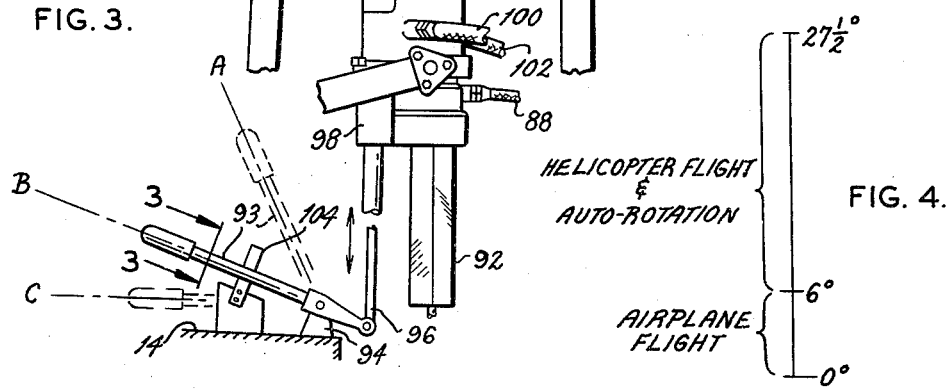
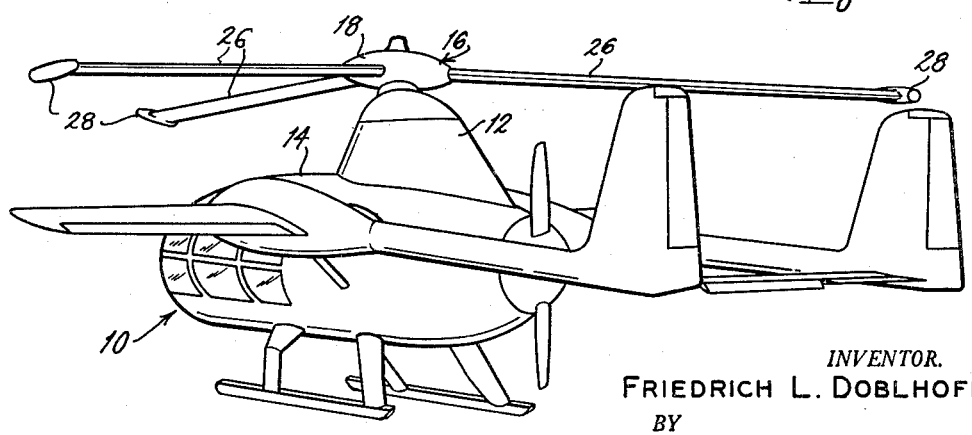
INVENTOR.
FRIEDRICH L. DOBLHOFF
BY
ATTORNEYS

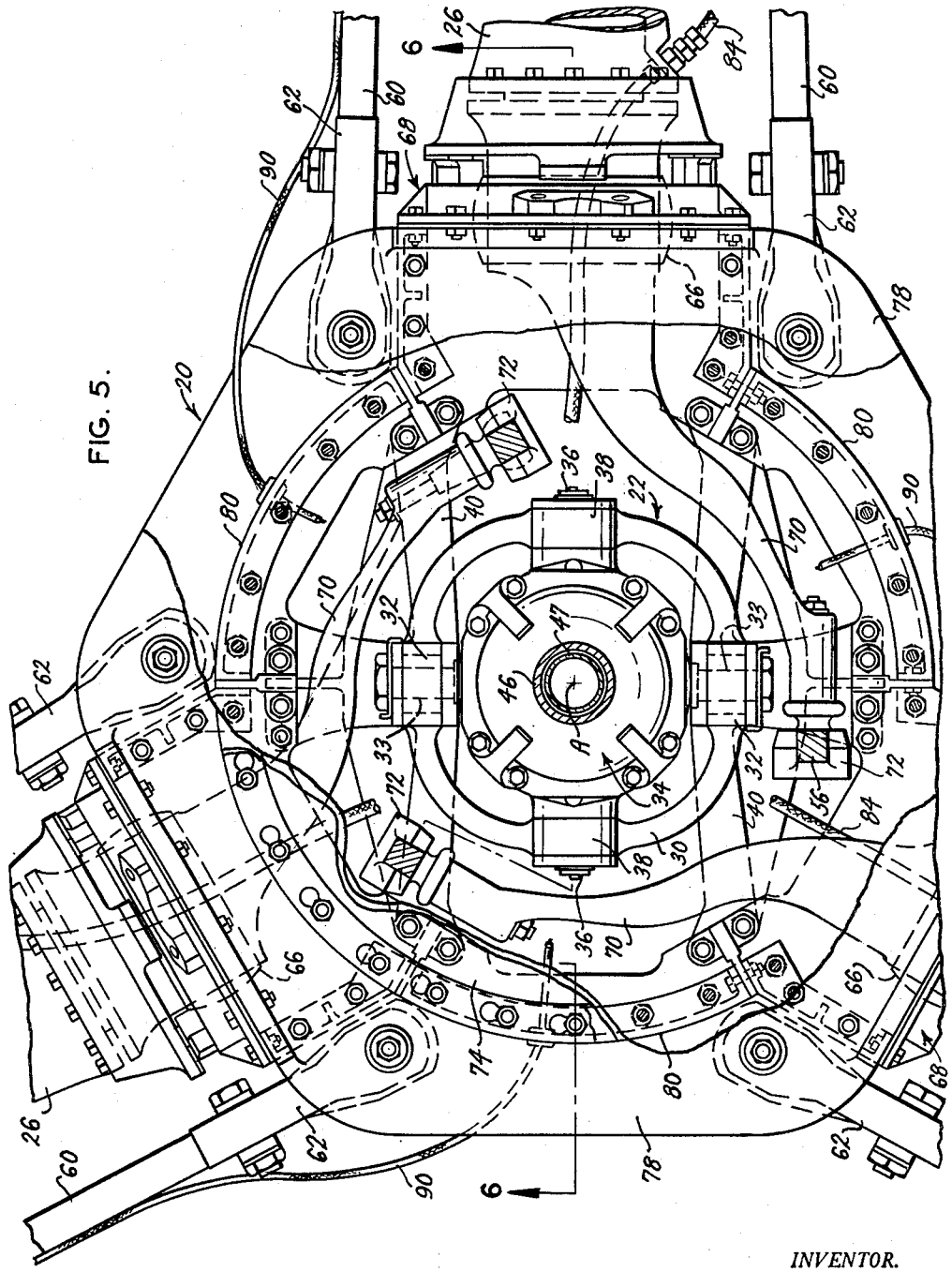

United States Patent Office 3,002,569
Patented Oct. 3, 1961

3,002,569
LOCKING DEVICE FOR FLOATING HUB HELICOPTER ROTORS
Friedrich L. Doblhoff, University City, Mo., assignor to McDonnell Aircraft Corporation, St. Louis, Mo., a corporation of Maryland
Filed May 28, 1959, Ser. No. 816,587
2 Claims. (Cl. 170—160.27)

This invention relates to rotary wing aircraft having a free floating rotor hub which can be restrained for high advanced ratio flight conditions in airplane flight, more particularly the invention relates to a device for locking the floating rotor hub under certain conditions of operation and handling of the aircraft.

The objects of the invention are to provide a free floating rotor hub system which can be restrained or locked against tilting to permit ground maneuvering, storage, and starting and stopping in extremely high winds or under gusty conditions; to provide a rotor hub locking means to allow for the attainment of very high forward speeds in airplane flight with the rotor load greatly reduced; and to provide means which permits the attainment of high torsional stiffness in the rotor control mechanism during airplane flight at very high forward speeds while allowing for a conventional and desirable system of rotor control in helicopter flight.

Helicopter rotors embodying floating hub arrangements are subject to the disadvantage that they are sensitive to winds when the rotor speed is low. Floating hub rotors used in unloaded rotor convertiplanes at high advanced ratios in airplane flight require very high torsional stiffness in the rotor blade control system, but the floating hub type rotor lacks such stiffness even if the swash plate and pitch linkage is infinitely stiff. This disadvantageous feature is apparent as the reaction to the pitch linkage force must be taken in the coning hinge, and the coning hinge can always displace itself by displacing the floating hub.

Therefore, it is a further object of this invention to provide means in a helicopter rotor control system for locking the rotor hub and thereby overcome the foregoing problems.

The present invention is best disclosed in its relation to a helicopter capable of airplane flight with the rotor unloaded. The rotor comprises a three-bladed flapping hinged rotor powered by a jet engine at the tip of each blade, and it embodies a free floating hub having novel means to lock the floating hub. The hub of the rotor is gimbal-mounted to allow full tilting, and the blades are allowed to pitch and cone with respect to the hub by means of a spherical socket type bearing in the hub. The blade torque tube is, in turn, connected to pitch links and to a stem which is extended through the gimbal center and into the pylon structure which supports the system. In this arrangement the stem may either be tilted to produce cyclic control of the blades or moved vertically to produce collective control of the blades. The pitch arms in this system are arranged in such manner that the rotor has pitch-cone coupling described and claimed in Hohenemser Patent 2,670,051. In a system of this character the free-floating hub is locked by reducing the collective blade pitch to approach zero lift at which time a novel device is effective to fix the stem relative to the hub so that for high advance ratio flight conditions in airplane flight the rotor becomes a pitch flap rotor having the required torsional stiffness.

Referring to the drawings:

FIG. 1 is a perspective view of a helicopter type aircraft embodying the hub locking device of this invention;

FIG. 2 is a fragmentary elevational view of the rotor hub structure for the aircraft of FIG. 1, with diagrammatically shown means to control the locking device;

FIG. 3 is a fragmentary detail of a position locating member for the control, as seen at line 3—3 in FIG. 2;

FIG. 4 is a simple line graph of the control range for the locking device, particularly showing the locked and unlocked condition of the rotor for helicopter and airplane flight;

Figure 6:
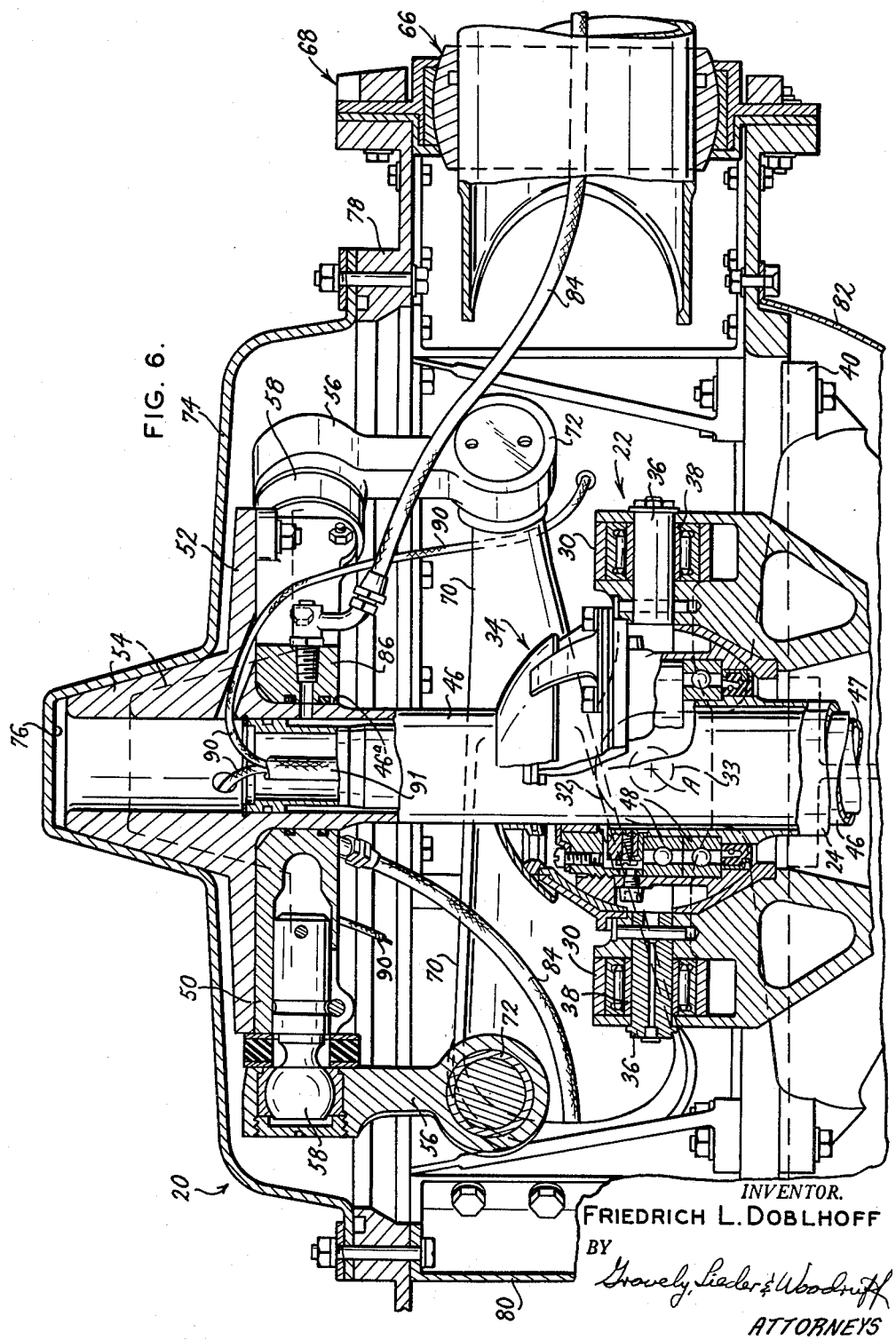

FIG. 5 is an enlarged and fragmentary plan view of the rotor hub structure showing the arrangement of the blades and gimbal mounting assembly therefor; and FIG. 6 is an enlarged and fragmentary sectional elevational view of the hub structure taken at line 6—6 in FIG. 5 and showing the locking device in locked position and the arrangement of one form of structure which will permit the invention to be practiced.

The invention hereof is applicable to helicopters having floating hub rotors to overcome the problem of sensitivity of floating hub rotors to ambient winds when the rotor speed is low. The invention is also applicable to floating hub rotors when the latter are used in unloaded rotor type convertiplanes at high advance ratios, to provide torsional stiffness in the rotor blade control system. Thus, it is a purpose of the invention to overcome the problems of low speed sensitivity and torsional stiffness in the control system for floating hub rotors.

A convertiplane 10 has been generally shown in FIG. 1 with a pylon structure 12 carried by the fuselage 14 to support the rotor assembly 16. The rotor assembly 16 has suitable fairing 18 arranged to enclose the hub 20 shown in FIGS. 2 and 6. The hub 20 is carried by a gimbal assembly 22 (FIG. 6) so that the rotor plane can be tilted by swinging or tilting the control stem 24. It is pointed out that the rotor has blades 26 which carry jet engines 28 at the blade tips.

Referring to FIGS. 2, 5 and 6, the rotor hub 20 is constructed to float on the gimbal assembly 22 so that it may be tilted in response to tilting of the control stem 24. The gimbal 22 includes an outer ring 30 supported in bearings 32 having an axis intersecting the point A, and an inner spherical or ball joint device 34 supported by shafts 36 in the bearings 38 of the outer ring 30. The bearings 32 are supported by the structure 40 which, in turn, is attached to the combustion air supply collector chamber 42 (FIG. 2) carried on structure 44 of the aircraft pylon 12. The chamber 42 receives air at supply conduit 43. In the gimbal assembly 22, shafts 36 have an axis which is normal to the axis of the shafts 33 of the outer gimbal ring 30 supported in bearings 32, such axis also intersecting point A. This gimbal assembly permits universal tilting movement of the stem 24 which extends through the ball joint device 34 and intersects point A, and point A is also the center of tilting of the rotor hub 20.

The stem 24 acts as a housing for a vertically movable tubular member 46 (FIG. 6) which extends through the joint device 34, and the stem is adapted to rotate relative to the joint upon bearings 48. The vertically movable member 46 encloses a sleeve 47 (FIG. 6), and these together extend above the ball joint to form an annular fuel conduit later described. The member 46 is formed with an outer annular land 46a to receive a swash plate 50 and adjacent the land is an upper head plate 52 surmounted by a locking projection 54. The swash plate 50 and head plate 52 move together in vertical directions and in rotation. The swash plate 50 carries rotor blade pitch links 56 upon suitable universal supports 58. There are in the example shown three rotor blades 26, and each blade is similarly connected to the hub assembly 20 by tension straps 60 (FIG. 2) extending from the attachment 62 on the hub to the attachment 64 on the blade. Furthermore, each blade has a certain universal freedom of movement relative to the hub assembly 20 permitted by the spherical element 66 enclosed by the socket means 68. The inner end of each blade 26 is provided with a pitch control horn member 70, all being shown in FIG. 5 and one being shown at the left in FIG. 6, to extend toward the right hand pitch link 56 where it is suitably connected in the eye element 72. The other members 70 (FIG. 5) are similar, and each member extends inwardly and backward relative to the direction of blade rotation to permit a control movement to be applied to the blade by a force couple between the coning hinge which is substantially in the elements 66—68 and the pitch link 56.

In the present assembly, the pitch control horns 70 are arranged to be moved collectively by the several pitch links 56 on the swash plate 50 so that lowering of the collective pitch is accomplished by raising the swash plate through elevation of member 46. This motion is applied to the locking projection 54 and forces the same upwardly, as from the broken line position in FIG. 6, into a hub cover plate 74 which is formed with a complementary socket or recess 76. The socket and projection are similarly cone-shaped or otherwise formed so that the meshing of the parts will occur even with some misalignment therebetween. The floating portions of the hub 20 include the cover 74, the attachment member 78 for the cover which is connected to the coning hinge socket means 68 and a combustion air distributing cell formed by an enclosure 80 connected to the cover 74 and to a spherical seal member 82. The member 82, in turn, is open to the chamber 42 and is adapted to keep losses to a minimum in the delivery of air to the distribution cell 80.

The jet engines 28 at the rotor blade tips receive the air from the cell 80 through the hollow portion of the blade, and fuel is supplied by the conduits 84 from a supply head 86 in the swash plate 50. The fuel supplied to the head 86 flows through the annular conduit formed between member 46 and sleeve 47 from a supply conduit 88. The jet engines are each provided with suitable electrical combustion ignitors (not shown), which ignitors are connected to electrical cables 90 leading upwardly through the sleeve 47 (FIG. 5) in a cable conduit 91. The conduit 91 terminates at an electrical junction unit 92 located below the actuator unit for the control stem member 46.

The collective pitch control for member 46 in stem 24 is responsive to a collective pitch control lever 93 operatively supported by bracket 94 on the structure of the fuselage 14. The lever 93 moves a link 96 which operates a power cylinder or actuator unit 98 having pressure fluid supply and return conduits 100 and 102 respectively. Any suitable actuator 98 may be used to raise or lower the member 46, hence it is not believed necessary to show the details thereof so long as it is understood that a system of valves responsive to link 96 directs the pressure fluid against suitable piston means in the actuator 98 to raise or lower member 46, as desired.

The collective pitch control over the rotor blades 26 (FIGS. 2 and 4) for an aircraft arranged to have autorotation and helicopter flight, and to have airplane flight is divided into two phases. In helicopter flight, the collective pitch control is maintained free to attain high collective blade pitch angles for hovering and other flight phases with the rotor loaded. In the present example, lever 93 has a position A which corresponds to a collective pitch angle of approximately 27½ degrees (FIG. 4). For example, as forward flight speed increases, the collective blade pitch setting of the lever 93 can be decreased toward position B (FIG. 2) where the pitch angle is reduced to approximately 6 degrees (FIG. 4). The lever 93 is provided with a resilient detent 104 (FIG. 3) to indicate to the pilot the attainment of the low collective pitch angle setting. The locking of the rotor hub 20 is indicated to the pilot by movement of the lever 93 past the detent 104 toward position C, and this phase is used for airplane flight at high forward speed with the rotor unloaded.

In this latter phase, the floating hub must have very high torsional stiffness in the control system and this is obtained by locking the swash plate 50 and collective pitch control head plate 52 to the floating hub cover plate 74.

The invention, therefore, is seen to reside in means for locking the floating hub of the rotor during the phase of operation when the collective pitch angle is very low, say from approximately 6 degrees to zero degrees. This phase includes starting the rotor, and stopping the same under gusty ambient wind conditions, and high speed airplane flight. In all of these conditions, the reduction in sensitiveness of the floating hub and the required increase in torsional stiffness of the control system is accomplished by meshing the projection 54 and recess 76, as shown in FIG. 6, and simultaneously reducing the blade pitch. At other times, such as in helicopter flight, the hub must be free to float. Thus, it is possible with the simple device disclosed herein to obtain the desired locking of the floating rotor hub by lowering the collective pitch, such as is shown by the graph of FIG. 4. The hub is, of course, fully locked when element 54 abuts element 74. At the locked position the pitch angle of the blades is not necessarily zero degrees but can have other values than zero dependent on the adjustment of the blade pitch control mechanism. The minimum pitch angle in the locked position can also have a small negative value. When lowering the pitch (raising element 54) there will be positions close to the fully locked position where the motion of the hub will be somewhat limited. The advantages of this invention are floating hub rotor starting in extremely high winds, and the attainment of very high forward speeds of unloaded rotor convertiplanes since it permits the attainment of high torsional stiffness in the blade control mechanism in airplane flight, while permitting a conventional and desirable method of rotor control in helicopter flight. When in airplane flight (high advance ratio flight conditions) the locked rotor becomes a pitch-flap rotor. Advance ratio means the ratio of forward flight speed over the tangential blade tip speed.

In its practical application, the present invention overcomes the serious problem of starting and stopping the rotor under windy conditions. In conventional rotors, the wind conditions cause the blades to move through large flapping angles so that there is danger of the blades striking the fuselage and tail structure. The locking device removes this hazard by reducing the pitch-cone coupling sensitivity of the rotor control system at the critical times when very low pitch angles can be tolerated. The invention also overcomes the problem of rotor control in convertiplanes when the aircraft is operated in airplane flight at high forward speeds. The locking device permits the attainment of torsional stiffness in a floating hub rotor system so that the rotor will have a minimum of interference in airplane flight, but will be controllable in a desirable manner in helicopter flight.

What is claimed is:

1. In a helicopter rotor control system for a floating hub bladed sustaining rotor, the improvement of a rotor hub assembly, a rotor hub supporting structure including a gimbal assembly permitting rotation and universal tilting movement of the rotor hub, cover means on said rotor assembly spaced from said gimbal assembly, means in said hub assembly operatively connecting the rotor blades for coning and for collective pitch variations, said means including longitudinally movable collective pitch control means operatively disposed between said cover means and gimbal assembly, and other means adapted to restrain universal tilting movement of said rotor hub at low collective pitch angles of the rotor blades, said restraining means comprising cooperating interengaging projection and socket means on said longitudinally movable control means and said cover means adapted to center said rotor hub in the axis of longitudinal movement of the control means.

2. The improvement set forth in claim 1, wherein said projection and socket means have conic profiles in sectional elevation to impart lateral displacement to said rotor hub assembly through relative sliding engagement of one with respect to the other, said conic profiles serving to rapidly bring said rotor hub into centered position.

References Cited in the file of this patent

UNITED STATES PATENTS

| | | |
|---|---|---|
| 2,404,522 | Nemeth | July 23, 1946 |
| 2,580,514 | Campbell | Jan. 1, 1952 |
| 2,670,051 | Hohenemser | Feb. 23, 1954 |